United States Patent
Bogema et al.

(10) Patent No.: US 9,068,492 B2
(45) Date of Patent: Jun. 30, 2015

(54) MOTOR VEHICLE ON-BOARD DIAGNOSTICS TO DISTINGUISH DEGRADATION FROM TAMPERING

(75) Inventors: John Paul Bogema, Flat Rock, MI (US); Peter Mitchell Lyon, Birmingham, MI (US); Bret Alan Zimmerman, Grosse Pointe Farms, MI (US); Todd Fagerman, Plymouth, MI (US); Todd Crompton, Redford, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 480 days.

(21) Appl. No.: 13/289,907

(22) Filed: Nov. 4, 2011

(65) Prior Publication Data

US 2013/0116881 A1    May 9, 2013

(51) Int. Cl.
*F01N 11/00* (2006.01)
*F01N 3/20* (2006.01)
*F02D 41/22* (2006.01)
*F01N 3/035* (2006.01)

(52) U.S. Cl.
CPC .............. *F01N 3/2066* (2013.01); *Y02T 10/40* (2013.01); *F02D 41/22* (2013.01); *F01N 3/035* (2013.01); *F01N 2550/05* (2013.01); *F01N 2550/24* (2013.01); *F01N 2900/0416* (2013.01); *F02D 2041/228* (2013.01); *Y02T 10/24* (2013.01)

(58) Field of Classification Search
CPC ..... F01N 11/00; F01N 3/208; F01N 2610/02; F01N 11/002; G01M 17/00; Y02T 10/47; Y02T 10/24; Y02T 10/40; Y02T 10/121; Y02T 10/26; Y02T 10/22; Y02T 10/144; Y02T 10/44; Y02T 10/123; Y02T 10/126; Y02T 10/32; Y02T 10/42
USPC .............. 701/1, 21, 29, 34, 36, 102, 103, 110
See application file for complete search history.

(56) References Cited

U.S. PATENT DOCUMENTS

| | | | |
|---|---|---|---|
| 6,266,955 B1 * | 7/2001 | Liang et al. | 60/274 |
| 6,363,771 B1 * | 4/2002 | Liang et al. | 73/23.31 |
| 6,708,104 B2 * | 3/2004 | Avery et al. | 701/110 |
| 7,631,552 B2 * | 12/2009 | Keski-Hynnila et al. | 73/114.74 |
| 2003/0023367 A1 * | 1/2003 | Avery et al. | 701/110 |
| 2005/0207936 A1 * | 9/2005 | Berryhill et al. | 422/63 |
| 2006/0218895 A1 * | 10/2006 | Wickert | 60/277 |
| 2007/0079601 A1 | 4/2007 | Hirata et al. | |
| 2008/0033609 A1 * | 2/2008 | Razavi | 701/33 |
| 2008/0148827 A1 * | 6/2008 | Keski-Hynnila et al. | 73/114.31 |
| 2008/0177436 A1 * | 7/2008 | Fortson | 701/29 |
| 2008/0271452 A1 * | 11/2008 | Reynolds et al. | 60/611 |
| 2009/0159132 A1 | 6/2009 | Gerlach | |
| 2009/0293457 A1 * | 12/2009 | Grichnik et al. | 60/286 |
| 2010/0037599 A1 | 2/2010 | Toshioka et al. | |
| 2010/0256874 A1 * | 10/2010 | Carresjo et al. | 701/48 |

* cited by examiner

*Primary Examiner* — John R Olszewski
*Assistant Examiner* — Truc M Do
(74) *Attorney, Agent, or Firm* — Julia Voutyras; Alleman Hall McCoy Russell & Tuttle LLP (57) ABSTRACT

A method for responding to conditions detected in an on-board diagnostic unit of a motor vehicle and signaling degradation of a component of the motor vehicle. The method includes providing a first response if the conditions signal degradation of the component due to tampering, and providing a second response if the conditions signal degradation of the component not due to tampering.

6 Claims, 6 Drawing Sheets

MOTOR VEHICLE ON-BOARD DIAGNOSTICS TO DISTINGUISH DEGRADATION FROM TAMPERING

TECHNICAL FIELD

This application relates to the field of motor vehicle engineering, and more particularly, to an on on-board diagnostic (OBD) system to distinguish component degradation from tampering.

BACKGROUND AND SUMMARY

A motor vehicle may be built equipped with various emissions-control components. Such components may be necessary in order to comply with government regulations on motor-vehicle emissions. Nevertheless, some motor-vehicle operators or service technicians may attempt to disable an emissions-control component in contravention of the regulations. Similarly, a operator or service technician may attempt to remove a safety feature of a motor vehicle or a feature whose removal voids a service warranty, rental agreement, etc.

In general, the OBD system of the motor vehicle may be used to detect degradation of various motor-vehicle components, whether caused by tampering, errors in servicing, or normal wear. Detection of component degradation may trigger a response by the OBD system: setting an appropriate electronic control-system flag, illuminating a dashboard signal, and/or restricting operation of the motor vehicle. In many cases, it is desirable to delay such actions until the degradation has been detected in two or more drive cycles, for increased tolerance to false-positive detection. However, to comply with some government regulations, the OBD must be able to detect emissions-control component tampering within a single drive cycle.

Accordingly, one embodiment of this disclosure provides a method for responding to conditions detected in an on-board diagnostic unit of a motor vehicle and signaling degradation of a component of the motor vehicle. The method includes providing a first response if the conditions signal degradation of the component due to tampering, and providing a second response if the conditions signal degradation of the component not due to tampering.

The summary above is provided to introduce a selected part of this disclosure in simplified form, not to identify key or essential features. The claimed subject matter, defined by the claims, is limited neither to the content of this summary nor to implementations that address problems or disadvantages noted herein.

DETAILED DESCRIPTION

Aspects of this disclosure will now be described by example and with reference to the illustrated embodiments listed above. Components, process steps, and other elements that may be substantially the same in one or more embodiments are identified coordinately and are described with minimal repetition. It will be noted, however, that elements identified coordinately may also differ to some degree. It will be further noted that the drawing figures included in this disclosure are schematic and generally not drawn to scale. Rather, the various drawing scales, aspect ratios, and numbers of components shown in the figures may be purposely distorted to make certain features or relationships easier to see.

Figure 1:
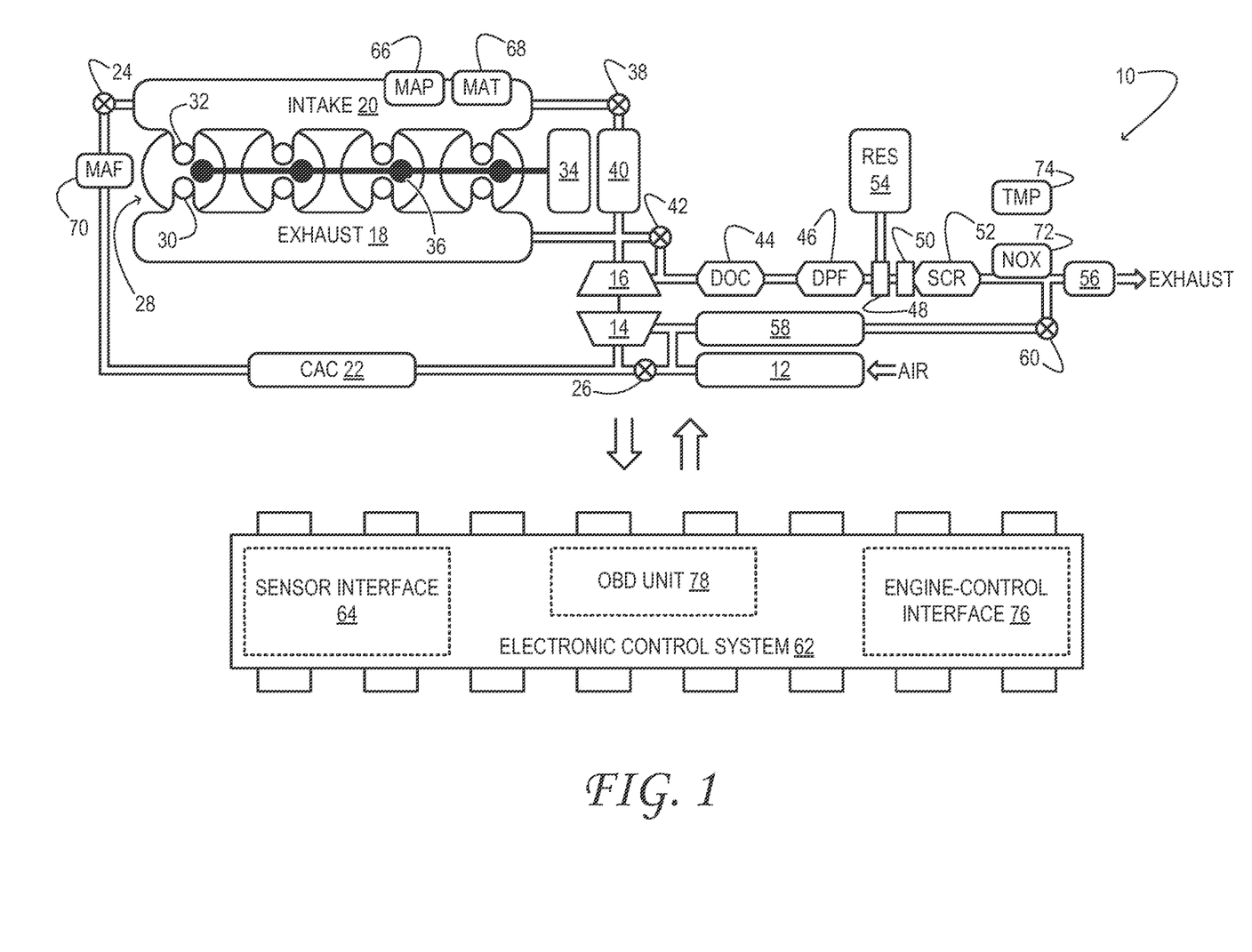
FIG. 1 schematically shows aspects of an engine system in accordance with an embodiment of this disclosure.

FIG. 1 schematically shows aspects of an example engine system 10 of a motor vehicle. In the illustrated engine system, fresh air is inducted into air cleaner 12 and flows to compressor 14. The compressor may be a motor- or driveshaft-driven supercharger compressor in some embodiments. In the illustrated embodiment, the compressor is a turbocharger compressor mechanically coupled to turbine 16, the turbine driven by expanding engine exhaust from exhaust manifold 18.

Compressor 14 is coupled fluidically to intake manifold 20 via charge-air cooler 22 and throttle valve 24. Pressurized air from the compressor flows through the charge-air cooler and the throttle valve en route to the intake manifold. In the illustrated embodiment, compressor by-pass valve 26 is coupled between the inlet and the outlet of the compressor. The compressor by-pass valve may be a normally closed valve configured to open to relieve excess boost pressure under selected operating conditions.

Exhaust manifold 18 and intake manifold 20 are coupled to a series of cylinders 28 through a series of exhaust valves 30 and intake valves 32, respectively. In one embodiment, the exhaust and/or intake valves may be electronically actuated. In another embodiment, the exhaust and/or intake valves may be cam actuated. Whether electronically actuated or cam actuated, the timing of exhaust and intake valve opening and closure may be adjusted as needed for desired combustion and emissions-control performance.

Cylinders 28 may be supplied any of a variety of fuels: gasoline, alcohols, diesel, biodiesel, compressed natural gas, etc. In the illustrated embodiment, fuel from fuel pump 34 is supplied to the cylinders via direct injection through fuel injectors 36. In the various embodiments considered herein, the fuel may be supplied via direct injection, port injection, throttle-body injection, or any combination thereof. In engine system 10, combustion is initiated via compression ignition. In other embodiments, combustion may be initiated via spark ignition.

Engine system 10 includes HP EGR valve 38 and HP EGR cooler 40. When the HP EGR valve is opened, some high-pressure exhaust from exhaust manifold 18 is drawn through the HP EGR cooler to intake manifold 20. In the intake manifold, the high pressure exhaust dilutes the intake-air charged for cooler combustion temperatures, decreased emissions, and other benefits. The remaining exhaust flows to turbine 16 to drive the turbine. When reduced turbine torque is desired, some exhaust may be directed instead through waste gate 42, by-passing the turbine. The combined exhaust flow from the turbine and the waste gate then flows through the various exhaust-aftertreatment devices of the engine system, as further described below.

In engine system 10, diesel oxidation catalyst (DOC) 44 is coupled downstream of turbine 16. The DOC includes an internal catalyst-support structure to which a DOC washcoat is applied. The DOC may be configured to oxidize residual CO, hydrogen, and hydrocarbons present in the engine exhaust.

Diesel particulate filter (DPF) 46 is coupled downstream of DOC 44. The DPF is a regenerable soot filter configured to trap soot entrained in the exhaust flow; it comprises a soot-filtering substrate. Applied to the substrate is a washcoat that promotes oxidation of the accumulated soot and recovery of filter capacity under certain conditions. In one embodiment, the accumulated soot may be subject to intermittent oxidizing conditions in which engine function is adjusted to temporarily provide higher-temperature exhaust. In another embodiment, the accumulated soot may be oxidized continuously or quasi-continuously during normal operating conditions.

Reductant injector 48, reductant mixer 50, and SCR stage 52 are coupled downstream of DPF 46 in engine system 10. The reductant injector is configured to receive a reductant (e.g., a urea solution) from reductant reservoir 54 and to controllably inject the reductant into the exhaust flow. The reductant injector may include a nozzle that disperses the reductant solution in the form of an aerosol. Arranged downstream of the reductant injector, the reductant mixer is configured to increase the extent and/or homogeneity of the dispersion of the injected reductant in the exhaust flow. The reductant mixer may include one or more vanes configured to swirl the exhaust flow and entrained reductant to improve the dispersion. On being dispersed in the hot engine exhaust, at least some of the injected reductant may decompose. In embodiments where the reductant is a urea solution, the reductant decomposes into water, ammonia, and carbon dioxide. The remaining urea decomposes on impact with the downstream SCR stage (vide infra).

SCR stage 52 is coupled downstream of reductant mixer 50. The SCR stage may be configured to facilitate one or more chemical reactions between ammonia formed by the decomposition of the injected reductant and nitrogen oxides ($NO_x$—e.g., nitric oxide and nitrogen dioxide) from the engine exhaust, thereby reducing the amount of $NO_x$ released into the ambient. The SCR stage comprises an internal catalyst-support structure to which an SCR washcoat is applied. The SCR washcoat is configured to sorb the $NO_x$ and ammonia, and to catalyze the redox reaction of the same to form dinitrogen ($N_2$) and water.

The nature, number, and arrangement of exhaust-aftertreatment components in engine system 10 may differ for the different embodiments of this disclosure. For instance, some of the components shown individually in FIG. 1 may be combined into a multi-purpose component. A selective catalytic reduction filter (SCRF) is one such component; it combines the functions of SCR stage 52 and DPF 46. In addition, some embodiments may include still other exhaust-aftertreatment components—e.g., one configured to trap $NO_x$ from the exhaust flow when the exhaust flow is lean, and to reduce the trapped $NO_x$ when the exhaust flow is rich.

Continuing in FIG. 1, all or part of the treated exhaust may be released into the ambient via silencer 56. Depending on operating conditions, however, some treated exhaust may be diverted through LP EGR cooler 58. The exhaust may be diverted by opening LP EGR valve 60 coupled in series with the LP EGR cooler. From LP EGR cooler 58, the cooled exhaust gas flows to compressor 14.

Engine system 10 includes electronic control system 62 configured to control various engine-system functions. The electronic control system includes memory and one or more processors configured for appropriate decision making responsive to sensor input and directed to intelligent control of engine-system componentry. Such decision-making may be enacted according to various strategies such as event-driven, interrupt-driven, multi-tasking, multi-threading, and the like. In this manner, the electronic control system may be configured to enact any or all aspects of the methods disclosed hereinafter. Accordingly, the method steps disclosed hereinafter—e.g., operations, functions, and/or acts—may be embodied as code programmed into machine-readable storage media in the electronic control system.

Figure 2:
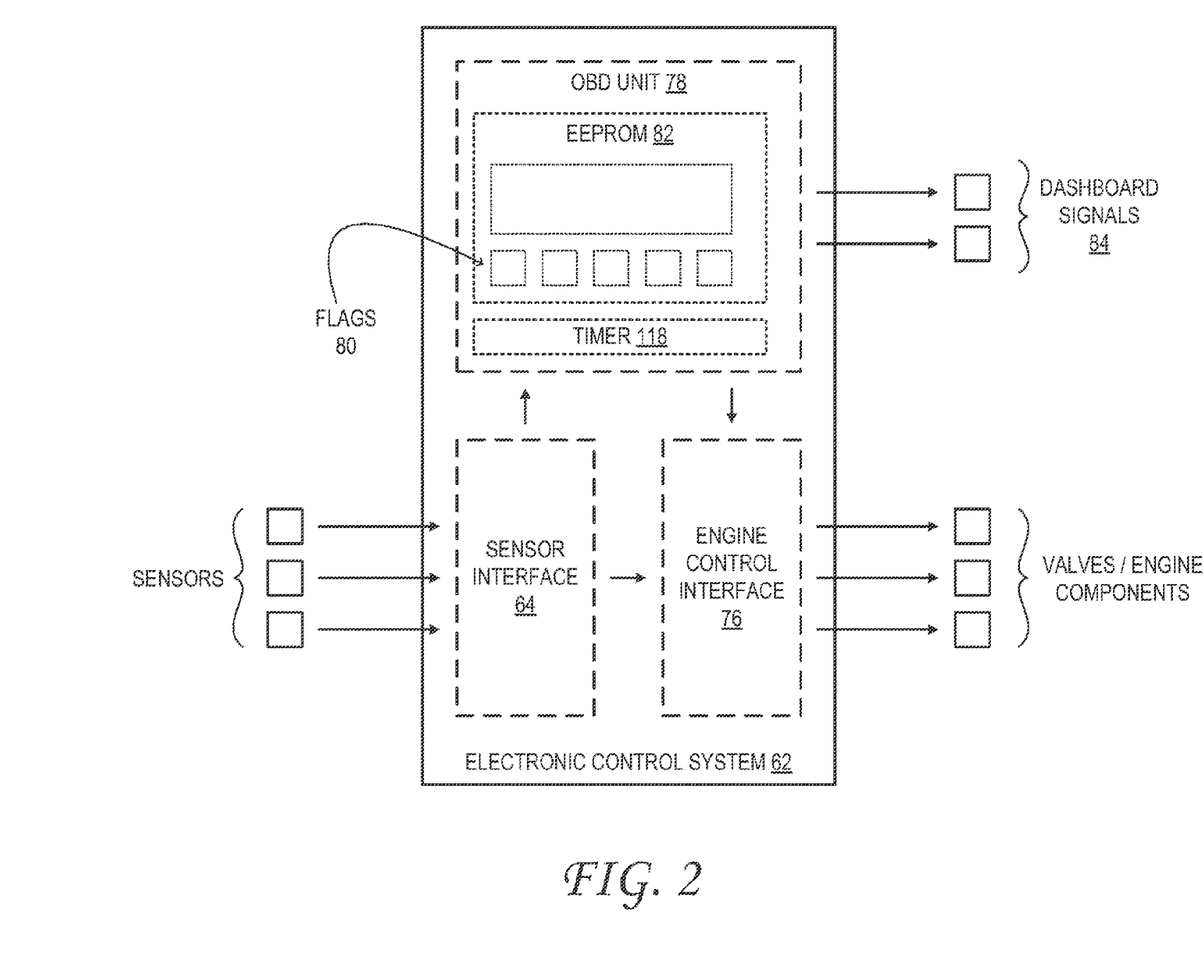
FIG. 2 schematically shows aspects of an electronic control system in accordance with an embodiment of this disclosure.

FIG. 2 schematically shows aspects of electronic control system 62 in greater detail. To assess operating conditions of engine system 10 and of the vehicle in which the engine system is installed, sensor interface 64 receives input from various sensors arranged in the vehicle—flow sensors, temperature sensors, pedal-position sensors, pressure sensors, etc. Some example sensors are shown in FIG. 1—manifold air-pressure (MAP) sensor 66, manifold air-temperature sensor (MAT) 68, mass air-flow (MAF) sensor 70, $NO_x$ sensor 72, and exhaust-system temperature sensor 74. By reading the output of $NO_x$ sensor 72, the electronic control system is able to assess the efficacy of $NO_x$ control in the engine system generally, and via SCR stage 52 in particular. A suitably low output of the $NO_x$ sensor may indicate that the SCR stage is functioning normally, that a suitably concentrated urea solution is contained in reductant reservoir 54, etc. Various other sensors may be provided as well.

Electronic control system 62 also includes engine-control interface 76. The engine-control interface is configured to actuate electronically controllable valves and other componentry of the vehicle—throttle valve 24, compressor by-pass valve 26, waste gate 42, and EGR valves 38 and 60, for example. The engine-control interface is operatively coupled to each electronically controlled valve and configured to command its opening, closure, and/or adjustment as needed to enact the control functions described herein.

Electronic control system 62 also includes on-board diagnostic (OBD) unit 78. The OBD unit is a portion of the electronic control system configured to diagnose degradation of various components of engine system 10. Such components may include $NO_x$ sensors, oxygen sensors, fuel injectors, and emissions-control components, as examples. The OBD unit may be used to detect degradation whether caused by tampering, errors in servicing, or normal wear.

Detection of component degradation may trigger a response by OBD unit 78. For example, a flag 80 specific to the degraded component and/or the nature of the degradation may be set in electronically erasable programmable read-only memory (EEPROM) 82 of the OBD unit. For certain kinds of degradation, an appropriate dashboard signal 84 may also be illuminated. And, in scenarios where operating the vehicle with the degraded component violates a regulation or contract agreement, vehicle operation may be restricted via engine-control interface 76. In many cases, it may be desirable to delay some or all of the above actions until the degradation has been detected in two or more drive cycles, for increased tolerance to false-positive detection. However, to comply with some government regulations, the OBD must be able to detect emissions-control component tampering within a single drive cycle. Moreover, a different level of response may be appropriate for degradation caused by tampering, as opposed to normal wear.

To address these issues while providing still other advantages, this disclosure describes various methods for responding to conditions that signal degradation of a motor-vehicle component. The methods are enabled by and described with continued reference to the above configurations. It will be understood, however, that the methods here described, and others fully within the scope of this disclosure, may be enabled by other configurations as well. The methods may be entered upon any time OBD unit 78 is operating, and may be executed repeatedly. Naturally, each execution of a method may change the entry conditions for subsequent execution and thereby invoke a complex decision-making logic. Such logic is fully contemplated in this disclosure.

Further, some of the process steps described and/or illustrated herein may, in some embodiments, be omitted without departing from the scope of this disclosure. Likewise, the indicated sequence of the process steps may not always be required to achieve the intended results, but is provided for ease of illustration and description. One or more of the illustrated actions, functions, or operations may be performed repeatedly, depending on the particular strategy being used.

Figure 3:
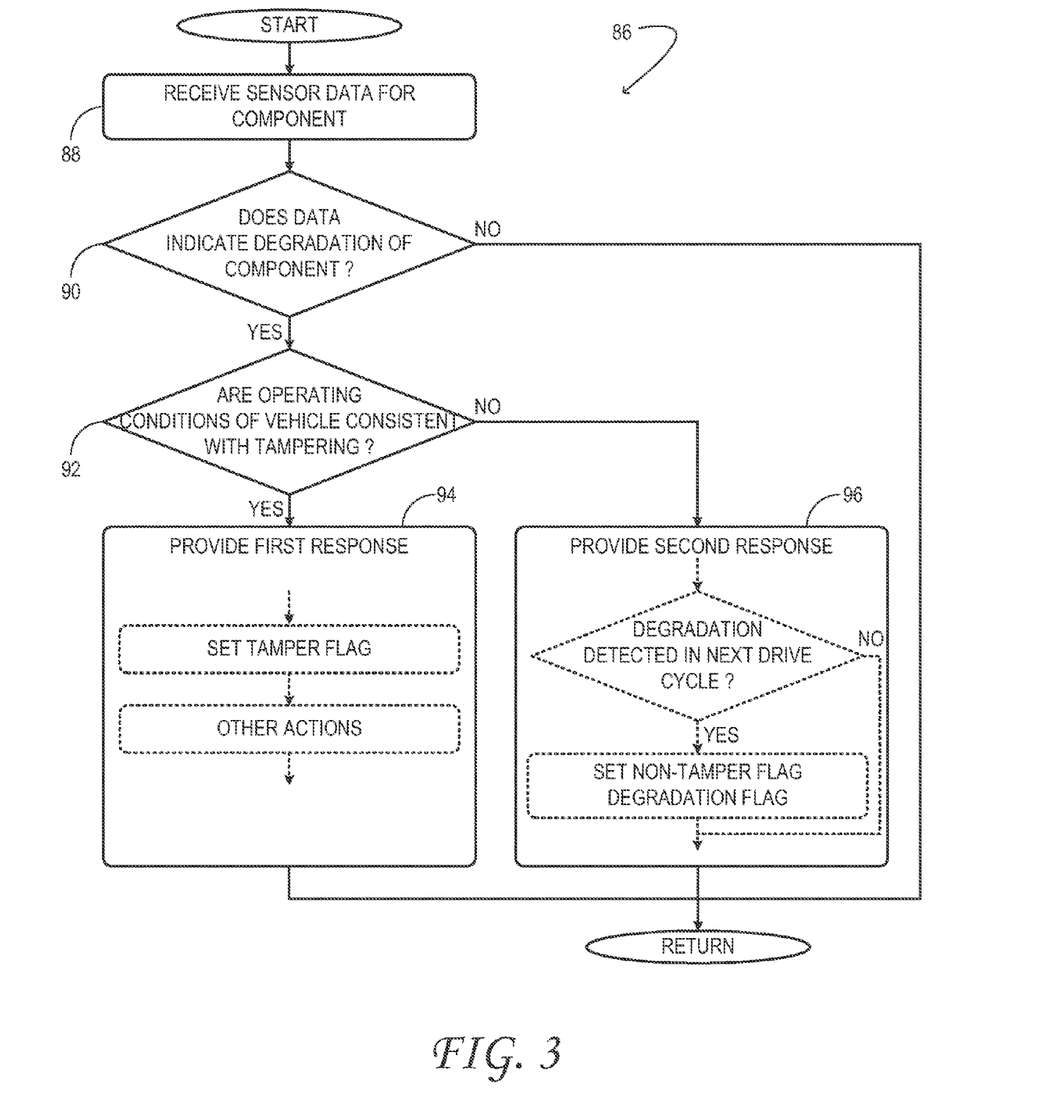
FIG. 3 illustrates aspects of a method for responding to conditions that signal degradation of a motor-vehicle component in accordance with an embodiment of this disclosure.

FIG. 3 illustrates an example method 86 for responding to conditions that signal degradation of a motor-vehicle component. In one embodiment, the component whose degradation is signaled may be a sensor associated with an emissions-control component—e.g., a $NO_x$ sensor coupled downstream of an SCR or other exhaust-aftertreatment stage of the motor vehicle. In other embodiments, the component may be a safety component—e.g., an airbag or anti-lock braking system. In still other embodiments, the component may be one whose deactivation would void a service warranty or rental agreement for the motor vehicle, such as a vehicle-speed governor.

At 88 of method 86, data related to the component is received in OBD unit 78 from one or more sensors of the motor vehicle. In one, non-limiting embodiment, the data may include analog data—e.g., a voltage—received from $NO_x$ sensor 72. At 90 it is determined whether the data received indicates degradation of the component. To this end, the data may be compared against an expected value or range of values. If the data received differs from the expected value or range, then degradation of the component is indicated, and the method advances to 92. In this manner, conditions signaling degradation of the component are detected in the OBD unit.

At 92 it is determined whether certain other conditions of the vehicle are consistent with the component being tampered with. If these conditions are consistent with the component being tampered with, then the method advances to 94, where a first response is provided. However, if the conditions are not consistent with the component being tampered with, then the method advances to 96, where a second response is provided. In this manner, tampering is distinguished from other causes of degradation: a first response is provided if the conditions signal degradation due to tampering; a second response is provided if the conditions signal component degradation not due to tampering.

In one embodiment, OBD unit 78 may determine based on data from a second sensor whether the degradation occurred during circumstances consistent with tampering. The second sensor could be a vehicle-speed sensor or exhaust-system temperature sensor, for example. The second response may be provided, for instance, if the motor vehicle is moving faster than a threshold speed (e.g., a lowest detectable speed, one mile per hour, etc.) when the conditions signaling degradation are detected. Or, the second response may be provided if an exhaust-system of the motor vehicle is above a threshold temperature (e.g., 100° C.) when such conditions are detected. In another embodiment, an electronic control-system timing function may establish whether circumstances were consistent with tampering when the degradation was first detected. For example, the first response may be provided if conditions signaling degradation are detected within a predefined interval (e.g., twenty minutes) following startup of the motor vehicle. In another example, the first response may be provided if such conditions are detected within a predefined interval (e.g., twenty minutes) following an idle period exceeding a threshold duration (e.g., ten minutes). In these examples, the first and second responses may be mutually exclusive—i.e., never enacted concurrently. Further, the second response may be provided in the event that degradation is detected and the first response is not provided, and vice versa.

The nature of the first response may differ in the different embodiments of this disclosure. In one embodiment, the first response may include setting a flag in OBD unit 78 that indicates component tampering. This flag may trigger subsequent actions of the first response, as further described below. In one embodiment, the conditions signaling component degradation may be detected and assessed for evidence of tampering within minutes of the tampering event—less than sixty minutes, less than thirty minutes, etc. In one embodiment, such detection and assessment may be done within a single drive cycle of the motor vehicle. In contrast, the second response may include determining whether such conditions are again detected in a subsequent drive cycle of the motor vehicle, as shown at 96. If the conditions are detected in at least the subsequent drive cycle, then a different flag may be set in the OBD unit—a flag that indicates component degradation not caused by tampering.

Figure 4:
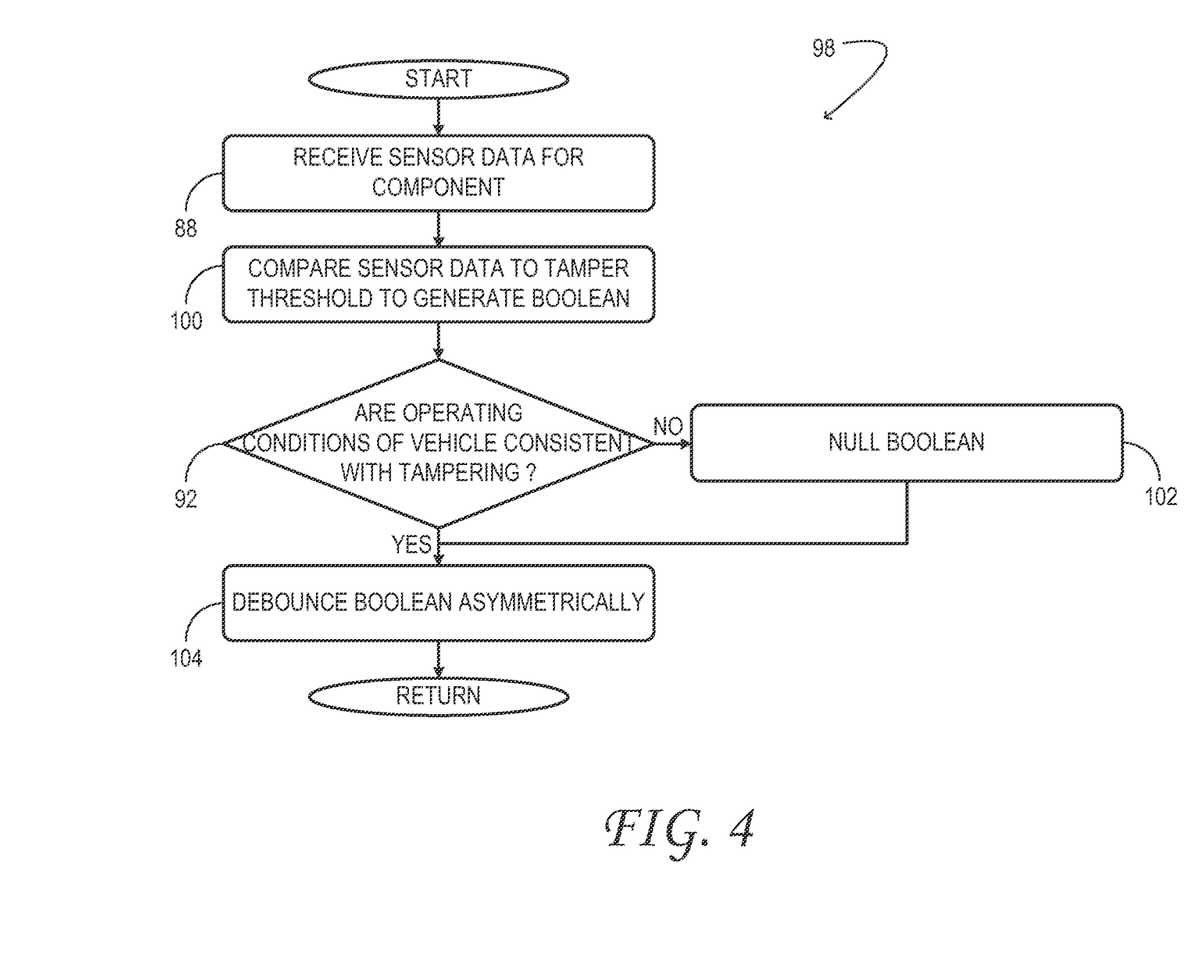
FIG. 4 illustrates aspects of another method for responding to conditions that signal degradation of a motor-vehicle component in accordance with an embodiment of this disclosure.

FIG. 4 illustrates aspects of another method 98 for responding to conditions that signal degradation of a motor-vehicle component. At 88 data related to the component is received from one or more sensors of the motor vehicle. At 100 the data is compared to a threshold to generate a boolean—i.e., a value of one or zero—one indicating that the component degradation is sufficient in degree to be caused by tampering, zero indicating that the component degradation is not sufficient to be caused by tampering. More specifically, the sensor data may be subtracted from a value expected for a non-degraded component. The difference between sensed and expected values may be compared to a threshold. If the absolute difference is greater than the threshold, then the boolean is set to one. Otherwise, the boolean is set to zero.

At 92 it is determined whether certain other conditions of the vehicle are consistent with the component being tampered with. If not, the boolean is nulled to zero, at 102. As a result of the sensory detection at 88, threshold comparison at 100, and selective nulling at 102, transient conditions suggestive of tampering promote the boolean to a value of one, and transient conditions not suggestive of tampering demote the boolean to a value of zero. To provide less transient result, method 98 includes at 104 a debouncing step. In one embodiment, the boolean may be debounced asymmetrically, such that the affirmative state (one) is filtered with a relatively long time constant, and the negative state (zero) is filtered with a relatively short time constant. In a more particular embodiment, the affirmative state may be filtered with a time constant of ten minutes or more, while the negative state may be filtered with a time constant of one second or less. By virtue of the debouncing, the first response may be provided if the conditions signaling degradation persist for a threshold duration—e.g., ten minutes or more. In contrast, the second response may be provided if the conditions do not persist for the threshold duration, as further described below.

Figure 5:
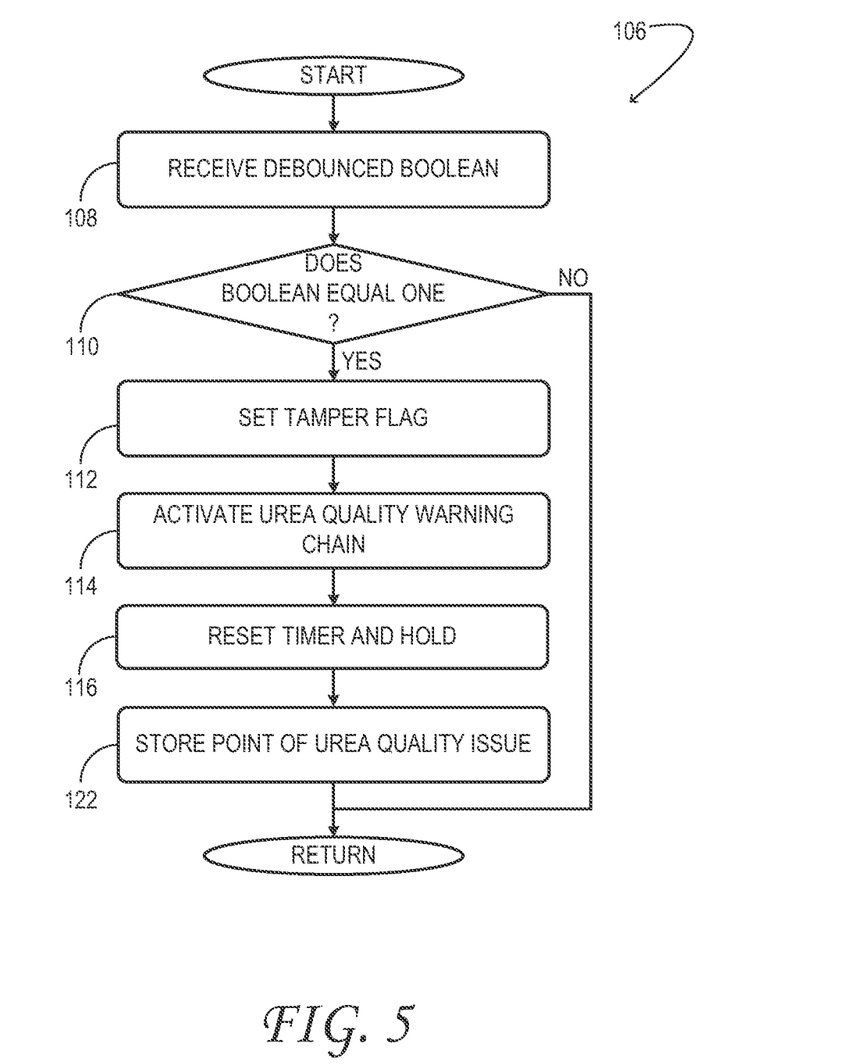
FIG. 5 illustrates aspects of a method for responding to conditions that signal degradation of an emissions-control component of a motor vehicle in accordance with an embodiment of this disclosure.

FIG. 5 illustrates aspects of a method 106 for responding to conditions that signal degradation of an emissions-control component of a motor vehicle—specifically, a sensor coupled downstream of an SCR stage. In one embodiment, method 106 may be a continuation of method 98 to be enacted on the debounced boolean provided therein. As such, a debounced boolean—e.g., the result of method 98—is received in the OBD unit at 108 of method 106. At 110 it is determined whether the debounced boolean has a logical value of one. In this case, the boolean distinguishes component tampering from degradation not due to tampering. A logical one indicates, for example, that a component of the SCR stage—e.g., a downstream $NO_x$ sensor—has been tampered with.

In this embodiment also, the OBD unit provides first response 94 if conditions signal degradation due to tampering. Here, the first response is embodied in method steps 112, ff. Accordingly, if the debounced boolean has a value of one, then the method advances to 112, where a tamper flag for the SCR stage is set in the OBD unit. The setting of the tamper flag may trigger subsequent actions of the first response, as further described below.

The reader will note that a likely motivation for tampering with an SCR stage of a motor vehicle is to avoid or silence the urea-quality warning chain (UQWC) that an OBD unit may enact when urea dosing provides inadequate $NO_x$ control. The UQWC may include an inducement mode to encourage the operator of the motor vehicle to replenish the urea in the reservoir. The inducement mode may start with a visual and/or audible warning, and, in its final stages, prevent the vehicle from exceeding a very low threshold speed—e.g. five miles per hour. Accordingly, in the illustrated embodiment, the setting of the tamper flag is followed, at 114, by preemptive activation of a UQWC that includes an inducement mode. In one embodiment, the inducement mode may limit the vehicle speed to a very low speed within four hours of activation of the UQWC.

In contrast, preemptive activation of the UQWC may not be included in the second response (vide supra), where tampering is not detected. In other words, SCR or $NO_x$ sensor degradation caused by normal wear may not trigger activation of the UQWC in the first drive cycle in which the degradation is detected. For degradation detected when the vehicle is moving or when the exhaust system is hot, for example, the UQWC may be delayed until the degradation is again detected in a subsequent drive cycle of the motor vehicle. Thus, the first response may impose a greater restriction on operation of the motor vehicle than does the second response.

Continuing in FIG. 5, method 106 then advances to 116, where a dedicated OBD timer 118 is reset to zero and held there; the function of this timer is more easily understood in the context of method 120, described below. At 122 the point in time at which the current urea quality issue first appeared is stored in the EEPROM of the OBD unit.

Figure 6:
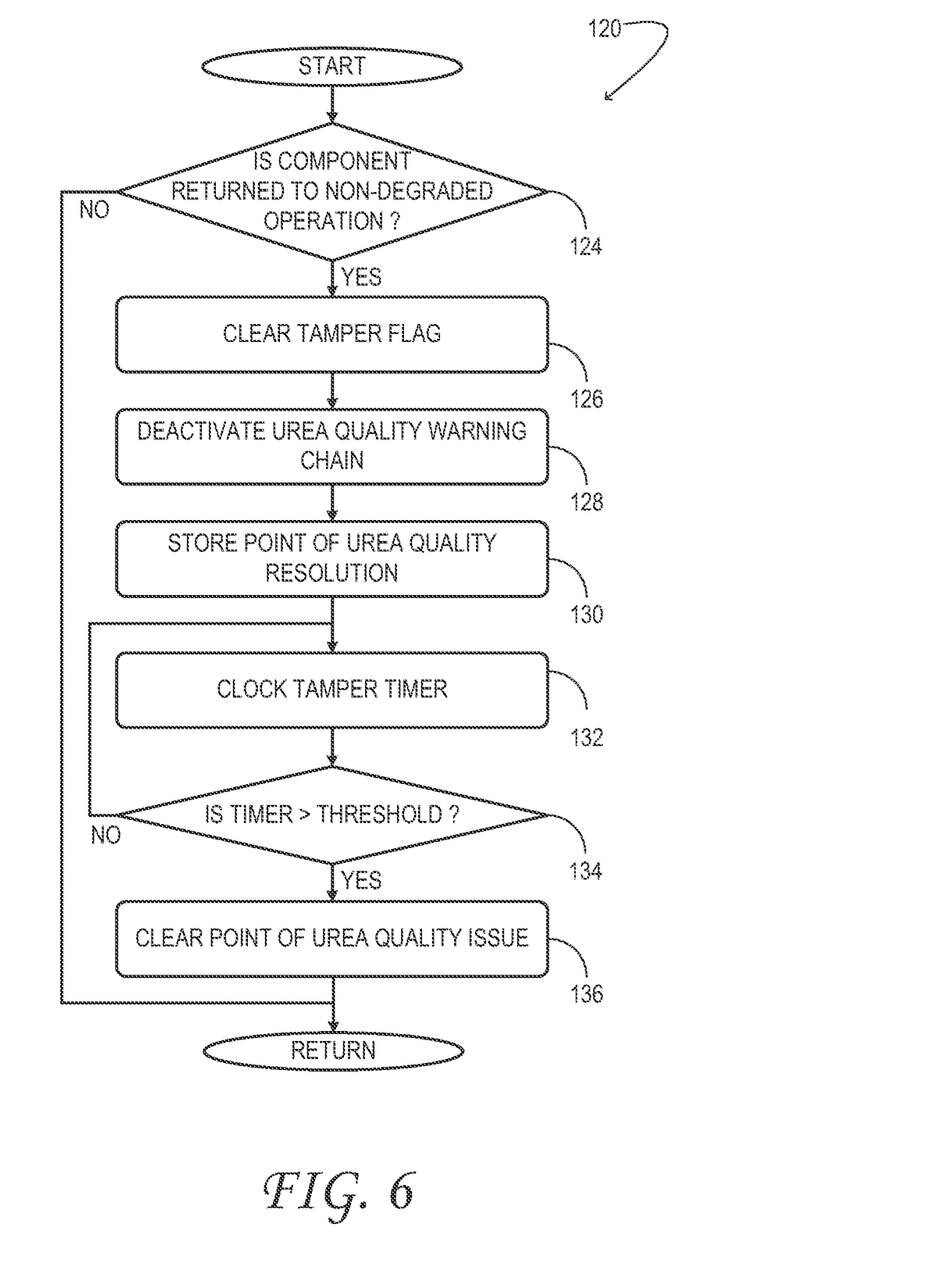
FIG. 6 illustrates aspects of a method for responding to corrective actions taken to reverse emissions-control component tampering in accordance with an embodiment of this disclosure.

FIG. 6 illustrates aspects of an example method 120 for responding to corrective actions taken to reverse the tampering identified in method 106 above. A motor-vehicle operator or service technician may be prompted to take such actions pursuant to the tamper flag being set in the OBD unit, activation of a UQWC, entry into an inducement mode, etc. As such, method 120 may be part of first response 94.

At 124 of method 120, the OBD unit determines whether the corrective actions have returned the degraded emissions-control component to non-degraded operation. If the actions have returned the component to non-degraded operation, then the method advances to 126, where the tamper flag in the OBD unit is cleared. At 128 the UQWC is deactivated. At 130 the point in time at which the urea quality issue was resolved is stored in the EEPROM, and at 132, dedicated OBD timer 118 is clocked. This timer keeps track of the time elapsed after the tamper flag is cleared. At 134 it is determined whether the value registered in this timer exceeds a threshold—forty hours in one example.

If the value does exceed the threshold, then the method returns to 132 where the timer continues to be clocked. When the timer finally exceeds the threshold, then the method advances to 136, where the urea quality issue is erased from the EEPROM, effectively restoring the EEPROM to its pre-tamper state. This aspect of method 120 addresses the scenario in which an operator may attempt to repeatedly disable an emissions-control sensor and after a period of operation re-enable it, in order to avoid the final, speed-limiting stage of the UQWC.

It will be understood that the articles, systems, and methods described hereinabove are embodiments of this disclosure—non-limiting examples for which numerous variations and extensions are contemplated as well. Accordingly, this disclosure includes all novel and non-obvious combinations and sub-combinations of the articles, systems, and methods disclosed herein, as well as any and all equivalents thereof.

The invention claimed is:

1. A method comprising:
   receiving data from first and second vehicle sensors;
   determining, in an on-board diagnostic unit of the vehicle, whether conditions signal degradation of a vehicle component during tampering based on the data, said determining yielding a boolean result indicating tampering when affirmative;
   debouncing the result asymmetrically;
   providing a first response when the conditions signal degradation due to tampering; and
   providing a second response when the conditions signal degradation not due to tampering.

2. The method of claim 1, wherein the determination is affirmative when the data from the first sensor is greater than a threshold above which the degradation is sufficient in degree to be caused by tampering.

3. The method of claim 2, wherein the determination is affirmative when it is determined, based on the data from a second sensor, that the degradation sufficient in degree to be caused by tampering occurred during circumstances consistent with tampering.

4. The method of claim 3 wherein an affirmative result is filtered with a longer time constant, and a negative result is filtered with a shorter time constant.

5. An on-board diagnostic unit for a motor vehicle comprising memory that encodes instructions readable by a processor and causes the processor to:
   receive data from a sensor arranged downstream of an SCR stage in the vehicle;
   compare the data to a threshold above which degradation of a component is sufficient in degree to be caused by tampering;
   determine whether the degradation sufficient in degree to be caused by tampering occurred during circumstances consistent with tampering;
   provide a first response when the degradation is sufficient in degree to be caused by tampering and occurred during circumstances consistent with tampering; and
   provide a second response when the degradation is insufficient in degree to be caused by tampering or occurred during circumstances not consistent with tampering.

6. The unit of claim 5 wherein the instructions cause the processor to receive the data, compare the data, and determine whether the degradation occurred during circumstances consistent with tampering, all in one drive cycle of the motor vehicle.

* * * * *